US012625243B2

(12) United States Patent
Hamilton et al.

(10) Patent No.: US 12,625,243 B2
(45) Date of Patent: May 12, 2026

(54) OPPORTUNISTIC PASSIVE MULTISTATIC RADAR PROCESSING FOR AUTOMOTIVE RADAR

(71) Applicant: GM Cruise Holdings LLC, San Francisco, CA (US)

(72) Inventors: Michael J. Hamilton, San Francisco, CA (US); Christoph Schwark, Munich (DE)

(73) Assignee: GM Cruise Holdings LLC, San Francisco, CA (US)

( * ) Notice: Subject to any disclaimer, the term of this patent is extended or adjusted under 35 U.S.C. 154(b) by 360 days.

(21) Appl. No.: 18/305,760

(22) Filed: Apr. 24, 2023

(65) Prior Publication Data

US 2024/0353548 A1     Oct. 24, 2024

(51) Int. Cl.
| | |
|---|---|
| *G01S 13/00* | (2006.01) |
| *G01S 7/02* | (2006.01) |
| *G01S 13/87* | (2006.01) |
| *G01S 13/931* | (2020.01) |

(52) U.S. Cl.
CPC ............ G01S 13/003 (2013.01); G01S 13/87 (2013.01); G01S 13/931 (2013.01); *G01S 7/023* (2013.01); *G01S 2013/9316* (2020.01)

(58) Field of Classification Search
CPC .... G01S 13/931; G01S 13/933; G01S 13/937; G01S 2013/9316; G01S 7/023; G01S 7/0235
USPC .......................................................... 342/70
See application file for complete search history.

(56) References Cited

U.S. PATENT DOCUMENTS

| | | | | |
|---|---|---|---|---|
| 6,888,491 B2 * | 5/2005 | Richter | ................... | G01S 13/22 |
| | | | | 342/159 |
| 8,301,325 B2 * | 10/2012 | Traster | ................... | G01S 15/931 |
| | | | | 701/23 |
| 9,223,009 B1 * | 12/2015 | Wasiewicz | .............. | G01S 13/24 |
| 10,222,453 B2 * | 3/2019 | Yomo | ................... | G01S 13/867 |
| 10,976,421 B2 * | 4/2021 | Zhang | ........................ | G01S 7/51 |
| 11,754,669 B2 * | 9/2023 | Gulati | ................... | G01S 13/325 |
| | | | | 342/201 |

(Continued)

OTHER PUBLICATIONS

"Extended European Search Report for European Patent Application No. 23169362.3", Mailed Date: Sep. 15, 2023, 14 pages.

*Primary Examiner* — Michael W Justice
(74) *Attorney, Agent, or Firm* — Honigman LLP; Matthew H. Szalach; Jonathan P. O'Brien

(57) ABSTRACT

Various technologies described herein pertain to opportunistically employing passive multistatic radar processing in automotive radar systems. A radar system of an autonomous vehicle is controlled to operate in an active mode during a first time period as the autonomous vehicle travels along a route. A transmitter and receiver of the radar system are enabled in the active mode. The radar system is controlled to operate in a passive mode during a second time period as the autonomous vehicle travels along the route. The transmitter is disabled and receiver is enabled in the passive mode. While in the passive mode, the receiver of the radar system receives a reflected radar signal responsive to a radar signal transmitted by a differing radar system of a differing autonomous vehicle. An object is detected based on the reflected radar signal and transmission information pertaining to the differing radar system of the differing autonomous vehicle.

20 Claims, 8 Drawing Sheets

(56)        References Cited

U.S. PATENT DOCUMENTS

| | | | | |
|---|---|---|---|---|
| 12,013,479 | B2 * | 6/2024 | Nakamizo | G01S 7/0236 |
| 12,164,054 | B2 * | 12/2024 | Markel | G01S 7/0231 |
| 12,227,178 | B2 * | 2/2025 | Hiramatsu | G06T 7/20 |
| 12,270,931 | B2 * | 4/2025 | Gulati | G01S 13/58 |
| 2004/0066323 | A1 * | 4/2004 | Richter | G01S 7/40 |
| | | | | 342/159 |
| 2007/0200747 | A1 * | 8/2007 | Okai | G01S 7/0235 |
| | | | | 342/159 |
| 2008/0106458 | A1 * | 5/2008 | Honda | G01S 7/023 |
| | | | | 342/59 |
| 2010/0023195 | A1 * | 1/2010 | Traster | G01S 15/931 |
| | | | | 367/99 |
| 2016/0349354 | A1 * | 12/2016 | Yomo | G01S 13/931 |
| 2020/0209370 | A1 * | 7/2020 | Zhang | G01S 7/003 |
| 2021/0096234 | A1 * | 4/2021 | Gulati | G01S 13/325 |
| 2022/0120845 | A1 * | 4/2022 | Gulati | G01S 13/931 |
| 2022/0326374 | A1 * | 10/2022 | Torres | G01S 7/0232 |
| 2022/0390550 | A1 * | 12/2022 | Markel | G01S 13/931 |
| 2023/0115845 | A1 * | 4/2023 | Hiramatsu | G06V 20/58 |
| | | | | 701/26 |
| 2024/0134000 | A1 * | 4/2024 | Nakamizo | G01S 13/87 |
| 2024/0205972 | A1 * | 6/2024 | Tertinek | H04B 17/336 |
| 2024/0230834 | A9 * | 7/2024 | Nakamizo | G01S 7/0236 |
| 2025/0020761 | A1 * | 1/2025 | Donderici | G01S 13/931 |

* cited by examiner

600

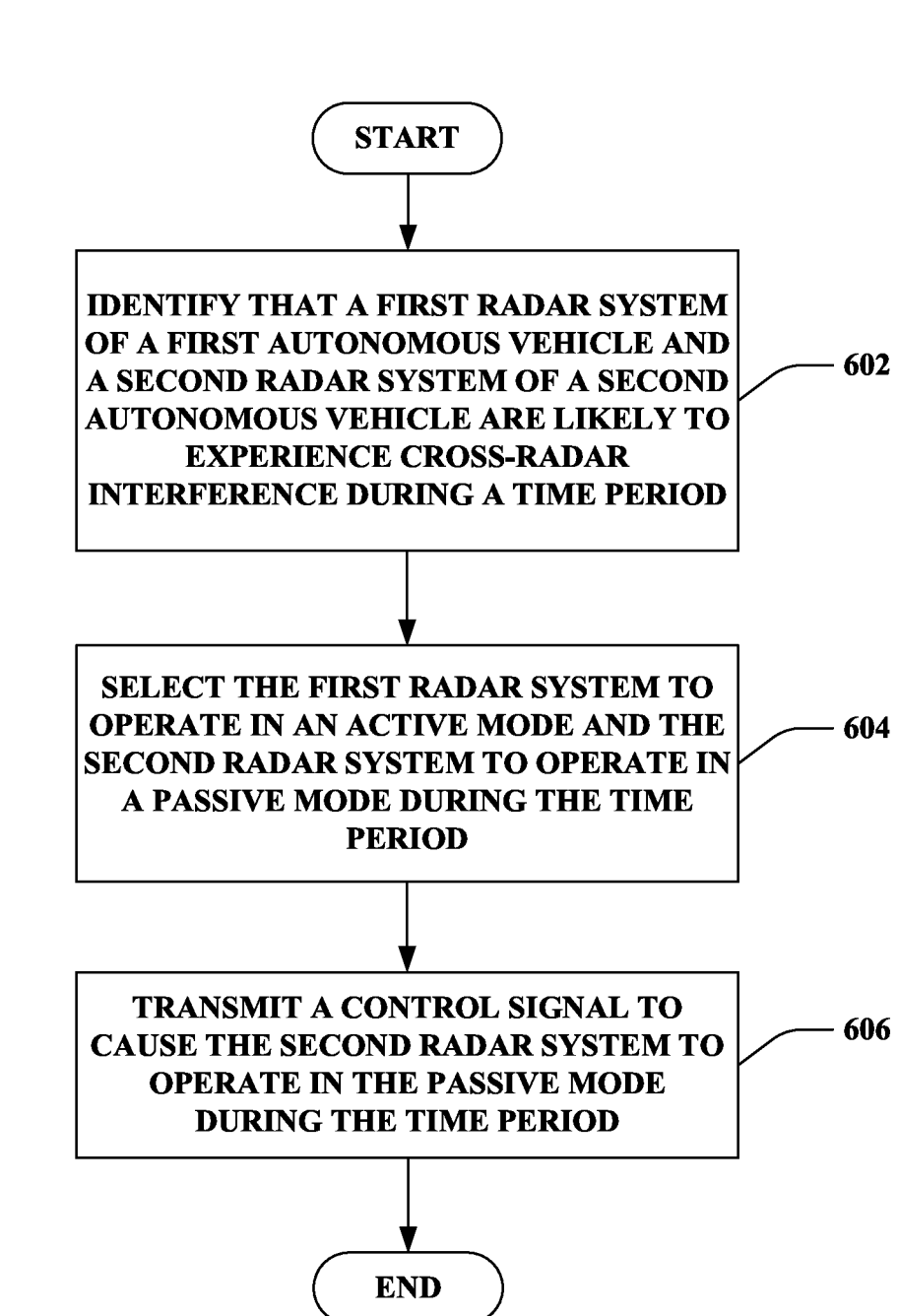

START

IDENTIFY THAT A FIRST RADAR SYSTEM OF A FIRST AUTONOMOUS VEHICLE AND A SECOND RADAR SYSTEM OF A SECOND AUTONOMOUS VEHICLE ARE LIKELY TO EXPERIENCE CROSS-RADAR INTERFERENCE DURING A TIME PERIOD — 602

SELECT THE FIRST RADAR SYSTEM TO OPERATE IN AN ACTIVE MODE AND THE SECOND RADAR SYSTEM TO OPERATE IN A PASSIVE MODE DURING THE TIME PERIOD — 604

TRANSMIT A CONTROL SIGNAL TO CAUSE THE SECOND RADAR SYSTEM TO OPERATE IN THE PASSIVE MODE DURING THE TIME PERIOD — 606

END

START

CONTROL A RADAR SYSTEM OF AN AUTONOMOUS VEHICLE TO OPERATE IN AN ACTIVE MODE DURING A FIRST TIME PERIOD — 702

CONTROL THE RADAR SYSTEM OF THE AUTONOMOUS VEHICLE TO OPERATE IN A PASSIVE MODE DURING A SECOND TIME PERIOD — 704

END

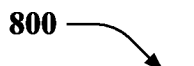
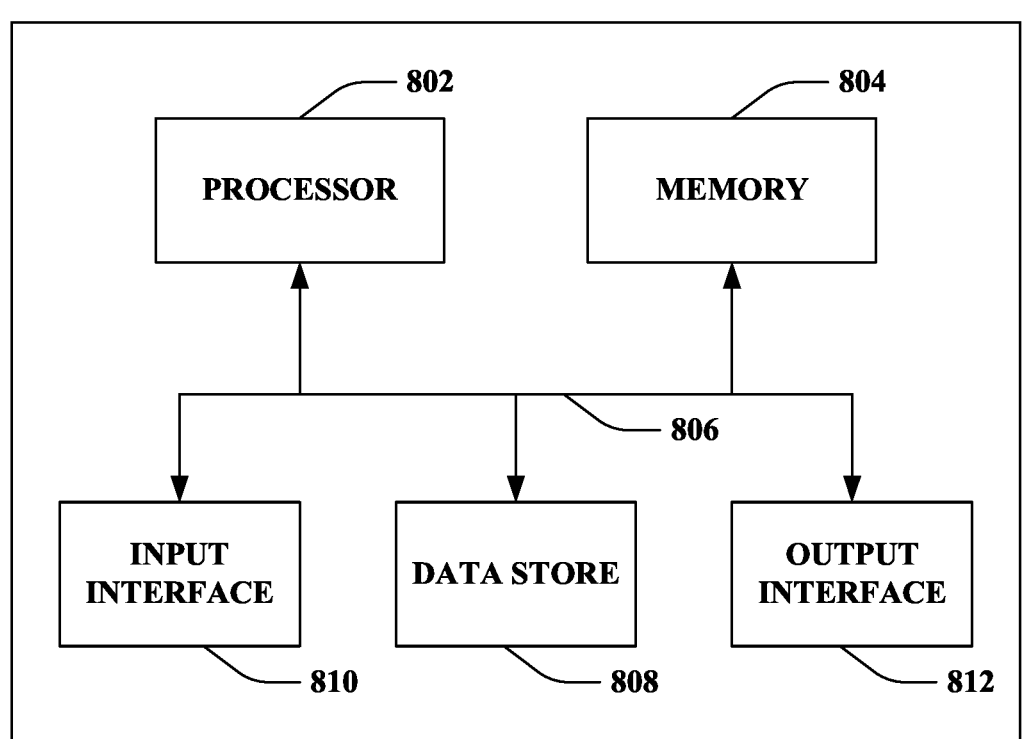
FIG. 8

OPPORTUNISTIC PASSIVE MULTISTATIC RADAR PROCESSING FOR AUTOMOTIVE RADAR

RELATED APPLICATION

This application claims priority to European Patent Application No. 23169362.3, filed on Apr. 24, 2023, and entitled "OPPORTUNISTIC PASSIVE MULTISTATIC RADAR PROCESSING FOR AUTOMOTIVE RADAR". The entirety of this application is incorporated herein by reference.

BACKGROUND

An autonomous vehicle perceives objects surrounding the autonomous vehicle based upon the sensor signals generated by sensor systems of the autonomous vehicle to enable navigating a driving environment. For example, the autonomous vehicle may include various sensor systems, such as a radar system, a camera system and/or a lidar system, for generating sensor signals. The autonomous vehicle also includes a centralized processing device that receives data based upon the sensor signals generated by the sensor systems and performs a variety of different tasks, such as detection of vehicles, pedestrians, and other objects. Based on an output of the processing device, the autonomous vehicle may perform a driving maneuver.

As the number of autonomous vehicles that operate in a driving environment increase, instances of cross-radar interference likewise increase. Moreover, some autonomous vehicles include a plurality of radar systems, which also leads to increased instances of cross-radar interference. When autonomous vehicles are within proximity of each other (e.g., within radar range), radar systems of the autonomous vehicles can interfere with each other. Within a fleet of autonomous vehicles, cross-radar interference can be more problematic since radar systems of the autonomous vehicles in the fleet are oftentimes time synchronized. For instance, the radar systems of the autonomous vehicles in a fleet can be offset at specific millisecond triggers from integer seconds from vehicle clocks. Further, the vehicle clocks can be closely synchronized with global positioning system (GPS) signals. As a result, the radar systems from multiple autonomous vehicles in the fleet can operate during common time periods, which increases the likelihood of overlapping signals entering acquisition windows of at least some of the radar systems.

According to an illustration, radar systems of two autonomous vehicles operating within proximity can interfere with each other due to timing synchronization between the radar systems. Following this illustration, the radar systems of the autonomous vehicles can each include a transmitter and a receiver. A first transmitter of the first radar system of the first autonomous vehicle and a second transmitter of the second radar system of the second autonomous vehicle can both transmit radar signals into a driving environment during substantially similar time periods. Accordingly, a first receiver of the first radar system can receive, from the driving environment, a reflected radar signal responsive to the radar signal transmitted by the first transmitter of the first radar system as well as an interfering radar signal responsive to the radar signal transmitted by the second transmitter of the second radar system. Similarly, a second receiver of the second radar system can receive, from the driving environment, a reflected radar signal responsive to the radar signal transmitted by the second transmitter of the second radar system as well as an interfering radar signal responsive to the radar signal transmitted by the first transmitter of the first radar system. Thus, in such a scenario, cross-radar interference can be experienced by the first radar system and the second radar system of the autonomous vehicles, which detrimentally impacts operation of the radar systems as well as the autonomous vehicles that include the radar systems.

SUMMARY

The following is a brief summary of subject matter that is described in greater detail herein. This summary is not intended to be limiting as to the scope of the claims.

Described herein are various technologies in which automotive radar systems opportunistically employ passive multistatic radar processing. An autonomous vehicle includes a radar system, which includes a transmitter and a receiver. The radar system can be controlled to operate in an active mode during a first time period as the autonomous vehicle travels along a route through the driving environment. Both the transmitter and the receiver of the radar system are enabled when operating in the active mode. Moreover, the radar system can be controlled to operate in a passive mode during a second time period as the autonomous vehicle travels along the route through the driving environment. The transmitter of the radar system is disabled and the receiver of the radar system is enabled when operating in the passive mode. While operating in the passive mode, the receiver of the radar system can receive a reflected radar signal from the driving environment; the reflected radar signal can be responsive to a radar signal transmitted by a differing radar system of a differing autonomous vehicle operating within proximity of the radar system of the autonomous vehicle. Further, an object in the driving environment can be detected based on the reflected radar signal and transmission information pertaining to the differing radar system of the differing autonomous vehicle.

In various embodiments, a server computing system can control whether the radar system of the autonomous vehicle is to operate in the active mode or the passive mode. The server computing system can similarly control whether other radar systems of other autonomous vehicles are to operate in the active mode or the passive mode. In other embodiments, the autonomous vehicles can control whether the respective radar systems are to operate in the active mode or the passive mode. Pursuant to an illustration, the autonomous vehicles can perform a negotiation therebetween to set the modes for the respective radar systems.

According to various embodiments, a server computing system can identify that a first radar system of a first autonomous vehicle and a second radar system of a second autonomous vehicle are likely to experience cross-radar interference during a time period as the first autonomous vehicle travels along a first route through a driving environment and the second autonomous vehicle travels along a second route through the driving environment. The first autonomous vehicle and the second autonomous vehicle are in a fleet of autonomous vehicles. Moreover, the server computing system can select the first radar system of the first autonomous vehicle to operate in the active mode and the second radar system of the second autonomous vehicle to operate in the passive mode during the time period. A first transmitter and a first receiver of the first radar system of the first autonomous vehicle are both enabled when operating in the active mode. A second transmitter of the second radar system of the second autonomous vehicle is disabled and a second receiver of the second radar system of the second autonomous vehicle is enabled when operating in the passive mode. Moreover, the server computing system can transmit, to the second autonomous vehicle, a control signal to cause the second radar system to operate in the passive mode during the time period. The second autonomous vehicle can receive the control signal and the second radar system can operate in the passive mode during the time period responsive to the control signal. Further, the server computing system can transmit, to the first autonomous vehicle, a control signal to cause the first radar system to operate in active mode during the time period. The first autonomous vehicle can receive the control signal and the first radar system can operate in the active mode during the time period responsive to the control signal.

The server computing system can also transmit transmission information pertaining to the radar systems to the autonomous vehicles. Following the example set forth above where the server computing system selects the first radar system of the first autonomous vehicle to operate in the active mode and the second radar system of the second autonomous vehicle to operate in the passive mode during the time period, the server computing system can further transmit, to the second autonomous vehicle, transmission information pertaining to the first radar system of the first autonomous vehicle. The transmission information pertaining to the first radar system can include location information specifying a location of the first radar system, waveform information specifying a waveform of a radar signal transmitted by the first transmitter of the first radar system, and/or timing information specifying timing of the radar signal transmitted by the first transmitter of the first radar system. The transmission information pertaining to first radar system can be utilized by the second radar system to detect an object in the driving environment (from a reflected radar signal received by the second receiver of the second radar system).

According to other embodiments, an autonomous vehicle having a radar system can control whether the radar system is to operate in the active mode or the passive mode. The autonomous vehicle can identify that the radar system and a differing radar system of a differing autonomous vehicle are likely to experience cross-radar interference. The autonomous vehicle can select the radar system of the autonomous vehicle to operate in the active mode and the differing radar system of the differing autonomous vehicle to operate in the passive mode during a first time period. The autonomous vehicle can send transmission information pertaining to the radar system to the differing autonomous vehicle during the first time period. Moreover, the autonomous vehicle can select the radar system of the autonomous vehicle to operate in the passive mode and the differing radar system of the differing autonomous vehicle to operate in the active mode during the second time period. Pursuant to an illustration, the foregoing selections can be made as part of a negotiation between the autonomous vehicle and the differing autonomous vehicle. Moreover, the autonomous vehicle can receive transmission information pertaining to the differing radar system of the differing autonomous vehicle (e.g., the transmission information can be received from the differing autonomous vehicle, from a server computing system, etc.); such transmission information can be utilized by the autonomous vehicle to detect object(s) when operating in the passive mode.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 is a flow diagram that illustrates an exemplary methodology of opportunistically controlling passive multistatic radar processing of radar systems of autonomous vehicles.

FIG. 8 illustrates an exemplary computing device.

DETAILED DESCRIPTION

Figure 1:
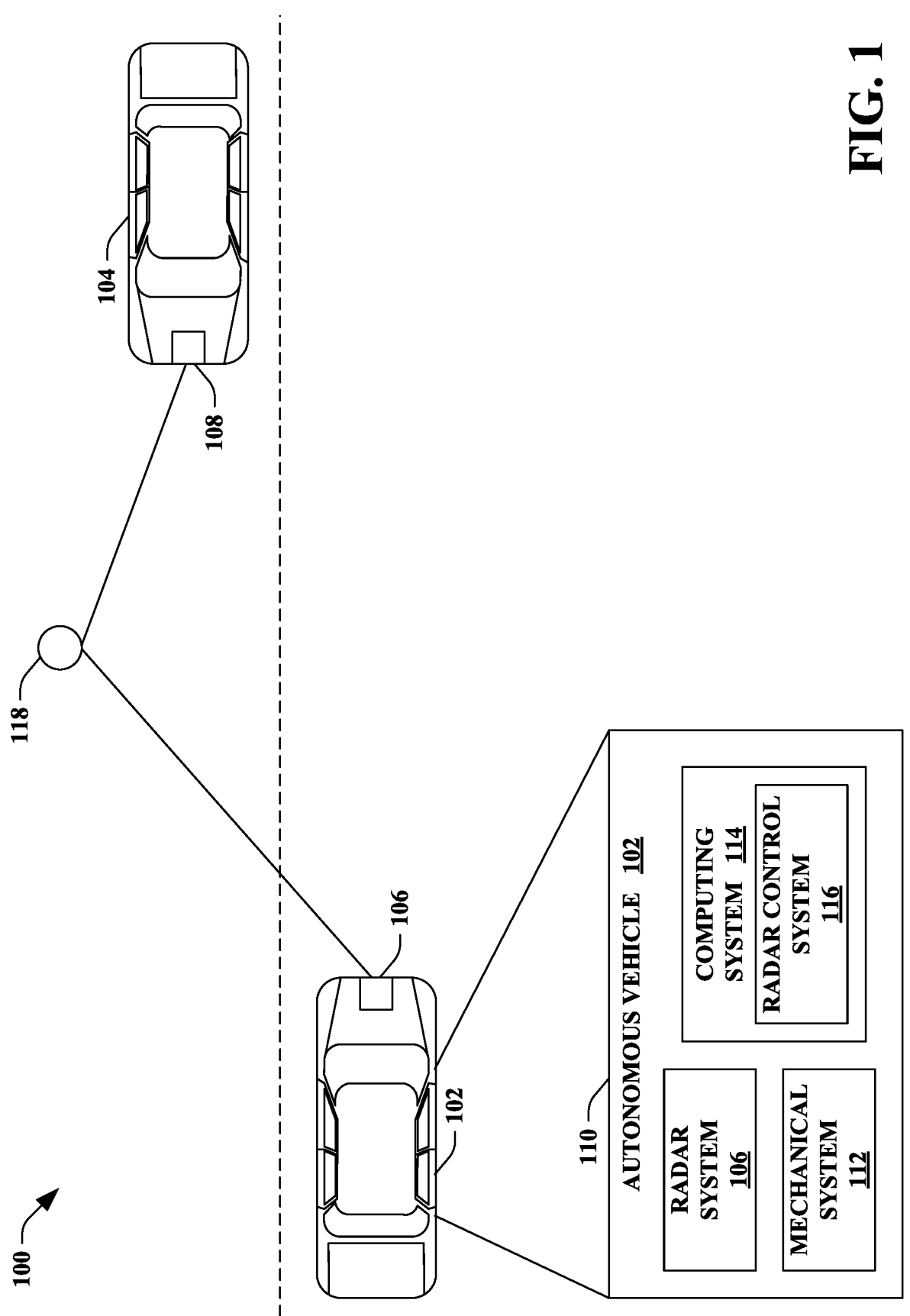
FIG. 1 illustrates an exemplary driving environment that includes autonomous vehicles that opportunistically employ passive multistatic radar processing.

Various technologies pertaining to opportunistically employing passive multistatic radar processing in automotive radar systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As used herein, the terms "first", "second", etc. are used for identification purposes; these terms are not intended to convey an ordering unless otherwise specified or clear from the context.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Examples set forth herein pertain to an autonomous vehicle including a radar system that opportunistically operates in active mode or passive mode to mitigate cross-radar interference between the radar system and differing radar system(s) of differing autonomous vehicle(s). It is to be understood, however, that the radar system described herein can be employed in a variety of different scenarios, such as flight, in drone technologies, in augmented reality (AR) or virtual reality (VR) technologies, in non-autonomous vehicles (e.g., in a fleet of non-autonomous vehicles), and so forth. Autonomous vehicles are set forth herein as one possible use case, and features of the claims are not to be limited to autonomous vehicles unless such claims explicitly recite an autonomous vehicle.

Referring now to the drawings, FIG. 1 illustrates an exemplary driving environment 100 that includes an autonomous vehicle 102 and an autonomous vehicle 104 (collectively referred to herein as autonomous vehicles 102-104) that opportunistically employ passive multistatic radar processing. While two autonomous vehicles 102-104 are depicted in the driving environment 100 of FIG. 1, it is to be appreciated that the examples set forth herein can be extended to the driving environment 100 including substantially any number of autonomous vehicles (e.g., more than the two autonomous vehicle 102-104). The autonomous vehicle 102 includes a radar system 106, and the autonomous vehicle 104 includes a radar system 108.

The autonomous vehicle 102 includes componentry depicted in callout 110. Thus, the autonomous vehicle 102 includes the radar system 106, a mechanical system 112 (e.g., a vehicle propulsion system, a braking system, a steering system, etc.), and a computing system 114 having a radar control system 116 incorporated therein. The radar control system 116 is configured to control the radar system 106 to operate in an active mode or a passive mode during a given time period. The radar control system 116 is further configured to change the mode in which the radar system 106 operates over time as described in greater detail herein (e.g., the radar control system 116 can cause the radar system 106 to switch from operating in an active mode during a first time period to operating in a passive mode during a second time period, and vice versa). Further, it is contemplated that the autonomous vehicle 104 (as well as other autonomous vehicles that can be in the driving environment 100) can be substantially similar to the autonomous vehicle 102 described herein.

While the autonomous vehicle 102 is shown as including one radar system 106, it is contemplated that the autonomous vehicle 102 can include a plurality of radar systems similar to the radar system 106. The plurality of radar systems can be located around the autonomous vehicle 102 and can have different fields of view relative to the autonomous vehicle 102 covering differing portions of the driving environment 100 surrounding the autonomous vehicle 102. Each of the radar systems of the autonomous vehicle 102 can be independently controlled by the radar control system 116. The autonomous vehicle 104 can likewise include a plurality of radar systems similar to the radar system 108.

As described in greater detail herein, cross-radar interference between the radar system 106 of the autonomous vehicle 102 and the radar system 108 of the autonomous vehicle 104 can be mitigated by opportunistically controlling the modes of the radar systems 106-108 (e.g., active mode versus passive mode) as the autonomous vehicles 102-104 travel through the driving environment 100 along respective routes. Further, the techniques employed herein can enable enhancing radar perception utilizing the radar systems 106-108 of the autonomous vehicles 102-104.

As depicted in the example of FIG. 1, the autonomous vehicle 102 is traveling along a first route through the driving environment 100 and the autonomous vehicle 104 is traveling along a second route through the driving environment 100. While the autonomous vehicle 102 and the autonomous vehicle 104 are in proximity of each other, the radar system 106 and the radar system 108 can be identified as likely to experience cross-radar interference. The term "likely to experience cross-radar interference" is intended to refer to the radar system 106 and the radar system 108 likely experiencing cross-radar interference if the techniques described herein were not employed.

Without employing the techniques described herein, a transmitter of the radar system 106 of the autonomous vehicle 102 and a transmitter of the radar system 108 of the autonomous vehicle can both transmit radar signals into the driving environment 100, where such radar signals are time synchronized. Accordingly, a receiver of the radar system 106 of the autonomous vehicle 102 can receive a reflected radar signal responsive to the radar signal transmitted by the transmitter of the radar system 106 as well as an interfering radar signal from the radar system 108 of the autonomous vehicle 104. For instance, the radar signal transmitted by the transmitter of the radar system 106 can propagate through the driving environment 100, reflect off an object 118, and return to the receiver of the radar system 106 as the reflected radar signal. Moreover, the interfering radar signal can be transmitted by the transmitter of the radar system 108 of the autonomous vehicle 104 and propagate through the driving environment 100 to the receiver of the radar system 106 of the autonomous vehicle 102 (e.g., the interfering radar signal can directly propagate through the driving environment 100 from the transmitter of the radar system 108 to the receiver of the radar system 106, propagate from the transmitter of the radar system 108 to the object 118 and reflect off the object 118 to the receiver of the radar system 106, etc.). Similarly, a receiver of the radar system 108 of the autonomous vehicle 104 can receive a reflected radar signal responsive to the radar signal transmitted by the transmitter of the radar system 108 as well as an interfering radar signal from the radar system 106 of the autonomous vehicle 102.

In contrast to the foregoing scenario, the radar system 106 and the radar system 108 can be controlled to mitigate such cross-radar interference which may otherwise occur between the radar systems 106-108 due to the relative locations of the autonomous vehicles 102-104. More particularly, one of the radar systems 106-108 can be selected to operate in an active mode and the other one of the radar systems 106-108 can be selected to operate in a passive mode during a time period responsive to identifying that the radar system 106 and the radar system 108 are likely to experience cross-radar interference during the time period. When operating in the active mode, both a transmitter and a receiver of a radar system are enabled. Moreover, when operating in the passive mode, a transmitter of a radar system is disabled while a receiver of the radar system is enabled.

According to an example, the autonomous vehicle 102 and the autonomous vehicle 104 can be within radar range of each other during a time period as the autonomous vehicle 102 travels along a first route through the driving environment 100 and the autonomous vehicle 104 travels along a second route through the driving environment 100. Following this example, it can be determined that the radar system 106 of the autonomous vehicle 102 and the radar system 108 of the autonomous vehicle 104 would likely experience cross-radar interference during a time period given the synchronization between the radar system 106 and the radar system 108. To mitigate the cross-radar interference, one of the radar systems 106-108 can operate in the active mode and the other one of the radar systems 106-108 can operate in the passive mode during the time period. Pursuant to an illustration, the radar system 106 can be caused to operate in the active mode and the radar system 108 can be caused to operate in the passive mode during the time period. The foregoing selection specifying which radar system 106-108 is in the active mode and which radar system 106-108 is in the passive mode is described in greater detail below. Further, the radar system operating in the passive mode (e.g., the radar system 108 in the foregoing illustration) can be updated with transmission information pertaining to the radar system operating in the active mode (e.g., the radar system 106 in the foregoing illustration). The transmission information pertaining to the radar system operating in the active mode, which can be provided to the radar system operating in the passive mode, can include location information specifying the location of the radar system operating in the active mode, waveform information specifying a waveform of a radar signal transmitted by the radar system operating in the active mode, and/or timing information specifying timing of the radar signal transmitted by the radar system operating in the active mode. The location information can include information pertaining to the current location and/or future location(s) of the radar system operating in the active mode. Moreover, various types of waveforms are intended to fall within the scope of the hereto appended claims (e.g., frequency modulated continuous wave (FMCW), orthogonal frequency division multiplexing (OFDM), etc.).

Again following the above illustration where the radar system 106 operates in the active mode and the radar system 108 operates in the passive mode, the transmitter of the radar system 106 can transmit a radar signal into the driving environment 100. The receiver of the radar system 106 can receive a reflected radar signal responsive to the transmitted radar signal (e.g., the radar signal can be transmitted into the driving environment 100 from the radar system 106, reflect off the object 118, and return to the radar system 106); thus, the radar system 106 can detect the object 118 based upon such reflected radar signal. Moreover, the receiver of the radar system 108 of the autonomous vehicle 104 can receive a reflected radar signal from the driving environment 100 responsive to the radar signal transmitted by the transmitter of the radar system 106 of the autonomous vehicle 102 (e.g., the radar signal transmitted into the driving environment 100 from the radar system 106 can further reflect off the object 118 and propagate to the radar system 108). Thus, the radar system 108 can record radar data from the driving environment 100 while in the passive mode without transmitting a radar signal into the driving environment 100 (e.g., the radar system 108 can receive a reflected radar signal responsive to a radar signal transmitted into the driving environment 100 by a differing radar system). The radar system 108 operating in the passive mode can detect the object 118 based on the reflected radar signal which is received responsive to the radar signal transmitted by the radar system 106 operating in the active mode. Accordingly, the reflected radar signal from an interfering source can be utilized as an offboard source of radar illumination by the radar system 108 operating in the passive mode.

According to an illustration, the autonomous vehicle 102 and the autonomous vehicle 104 are operating within radar range of each other in the driving environment 100. Without employing the techniques set forth herein, the radar system 106 of the autonomous vehicle 102 and the radar system 108 of the autonomous vehicle 104 would likely interfere with each other, given the timing synchronization between the radar systems 106 and 108. Instead, one of the radar systems 106 and 108 (e.g., the radar system 106 in the continuing example) is in the active mode and the other one of the radar systems 106 and 108 (e.g., the radar system 108 in the continuing example) is in the passive mode during a time period. Communications between the autonomous vehicles 102-104 and/or from a server computing system can enable coordination of the respective modes of the radar systems 106 and 108. Further, location information specifying the location of the radar system 106 in the active mode can be provided to the radar system 108 in the passive mode. In the passive mode, the radar system 108 records radar signals but does not transmit radar signals. The radar system 108 operating in the passive mode can mix radar signals, perform fast Fourier transform (FFT) processing, detect a direct path pulse train of the radar signal from the radar system 106 operating in the active mode, and/or detect reflections of the radar signal from the radar system 106 operating in the active mode present in a field of view of the radar system 108. Moreover, the radar system 108 operating in the passive mode can compute offsets from the direct path. Using the computed offsets, locations of both the radar system 106 and the radar system 108, passive direction of arrival beamforming, and geometric transforms, a location of a target (e.g., the object 118) in the field of view of the radar system 108 can be computed (e.g., by the radar system 108 operating in the passive mode and/or a computing system of the autonomous vehicle 104 including the radar system 108 operating in the passive mode). It is contemplated that the foregoing approach can be scaled to multiple autonomous vehicles, with radar systems of vehicles operated in passive or active mode so as to mitigate interference across the group of vehicles and/or enhance localization of targets in fields of view of the radar systems.

The techniques set forth herein can be employed to mitigate cross-radar interference between radar systems within a fleet of vehicles (e.g., the autonomous vehicles 102-104) while also enhancing radar perception. For instance, multistatic radar can enhance the ability of a radar system to detect a target object by illuminating the target object from multiple angles. Accordingly, tracking capabilities can be enhanced by leveraging the opportunistic multistatic radar approaches described herein. The foregoing can be supported by leveraging cooperation between the autonomous vehicles 102-104 in the fleet as well as localization techniques for determining locations of the autonomous vehicles 102-104 in the driving environment 100. Thus, randomness of the locations of the autonomous vehicles 102-104 over time as the vehicles travel along respective routes in the driving environment 100 can be opportunistically employed using the techniques described herein (e.g., the autonomous vehicles 102-104 need not purposefully be maneuvered into given positions in the driving environment 100 to mitigate the cross-radar interference, rather decisions regarding modes in which the radar systems are to operate can be made based on the locations as the vehicles follow their respective routes).

Figure 2:
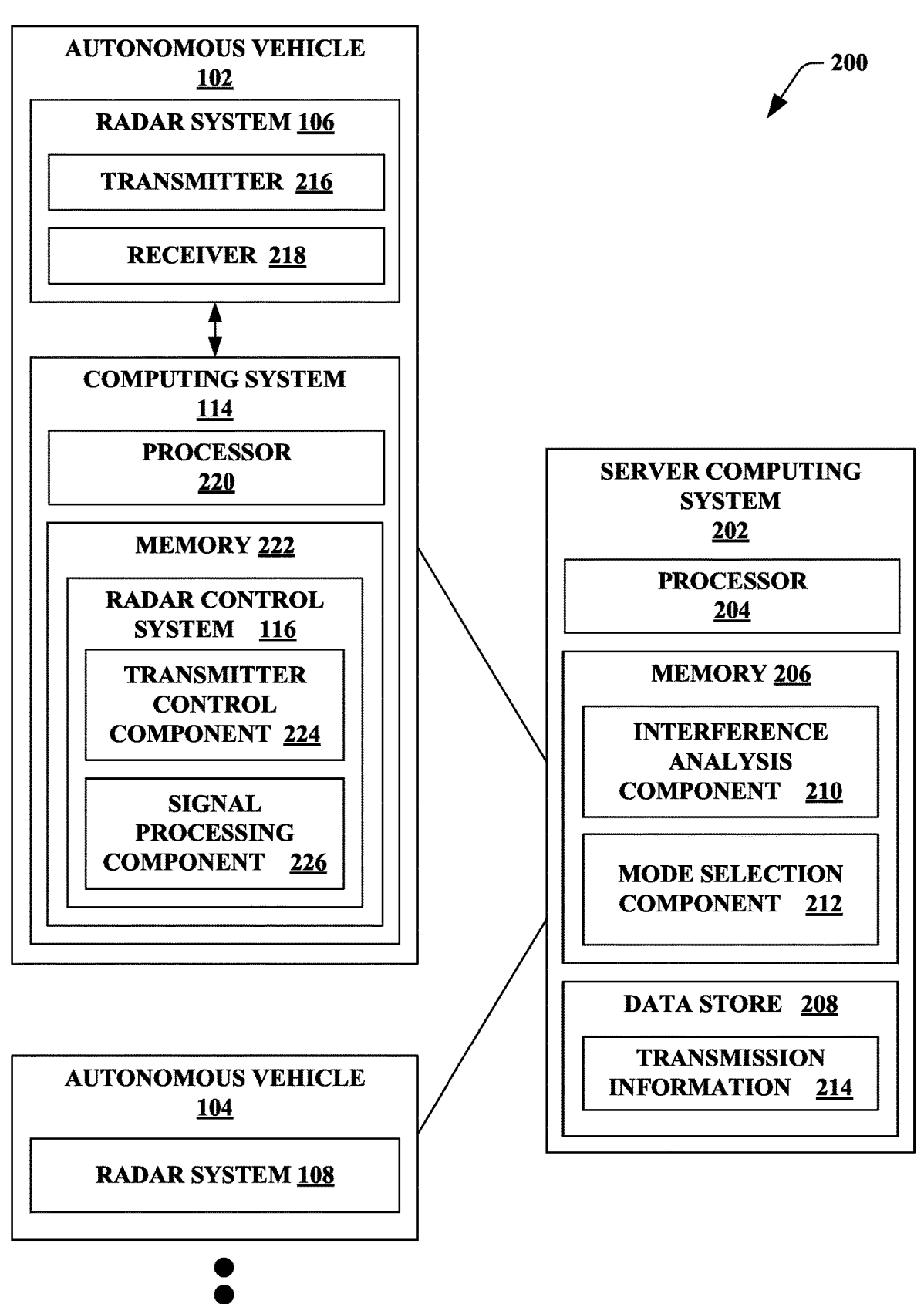
FIG. 2 illustrates a block diagram of an exemplary system in which a server computing system opportunistically manages passive multistatic radar processing within a fleet of autonomous vehicles.

Now turning to FIG. 2, illustrated is an exemplary system 200 in which a server computing system 202 opportunistically manages passive multistatic radar processing within a fleet of autonomous vehicles 102-104. As depicted, the system 200 includes the autonomous vehicle 102 and the autonomous vehicle 104; yet, it is contemplated that the system 200 can include substantially any number of autonomous vehicles, each of which can be substantially similar to the autonomous vehicles 102-104. According to an example, the server computing system 202 can be a remote server computing system separate from the autonomous vehicles 102-104 in the fleet. Pursuant to another example, the server computing system 202 can be an on-vehicle server computing system (e.g., one or more autonomous vehicles in the fleet of autonomous vehicles 102-104 can include the server computing system 202). The server computing system 202 includes a processor 204 and memory 206; the memory 206 includes computer-executable instructions that are executed by the processor 204. Pursuant to various examples, the processor 204 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like. Moreover, the server computing system 202 can include a data store 208.

The memory 206 of the server computing system 202 can include an interference analysis component 210 and a mode selection component 212. The interference analysis component 210 can identify that a first radar system of a first autonomous vehicle and a second radar system of a second autonomous vehicle are likely to experience cross-radar interference during a time period as the first autonomous vehicle travels along a first route through a driving environment and the second autonomous vehicle travels along a second route through the driving environment. For instance, the interference analysis component 210 can identify that the radar system 106 of the autonomous vehicle 102 and the radar system 108 of the autonomous vehicle 104 are likely to experience cross-radar interference during the time period. It is to be appreciated that the interference analysis component 210 can identify that more than two radar systems of differing autonomous vehicles are likely to experience cross-radar interference between each other during the time period. Thus, while many of the examples set forth below describe two radar systems (e.g., the radar systems 106 and 108) being identified as likely to experience cross-radar interference and subsequently controlled, these examples can be extended to scenarios where more than two radar systems are identified as likely to experience cross-radar interference and controlled to support opportunistic passive multistatic radar processing.

As noted above, the interference analysis component 210 can identify that the radar system 106 of the autonomous vehicle 102 and the radar system 108 of the autonomous vehicle 104 are likely to experience cross-radar interference during the time period. The interference analysis component 210 can identify that the radar system 106 of the autonomous vehicle 102 and the radar system 108 of the autonomous vehicle 104 are likely to experience cross-radar interference based on a distance between the radar system 106 and the radar system 108, a first field of view of the radar system 106, and a second field of view of the radar system 108. For instance, the interference analysis component 210 can utilize location information pertaining to locations of the autonomous vehicle 102 and the autonomous vehicle 104 within the driving environment to determine that the radar system 106 and the radar system 108 are within radar range of each other. For example, radar range can be specified as the radar system 106 and the radar system 108 being within 100 meters of each other, 250 meters of each other, or the like. Moreover, the interference analysis component 210 can determine that the radar system 106 and the radar system 108 are oriented with respect to each other such that the cross-radar interference would likely occur based on the radar system 108 being within the field of view of the radar system 106 and/or the radar system 106 being within the field of view of the radar system 108. The interference analysis component 210 can additionally or alternatively employ information specifying orientations of the autonomous vehicle 102 and the autonomous vehicle 104 within the driving environment as well as information indicating positions of the radar systems 106-108 relative to the autonomous vehicles 102-104 (e.g., orientation of the radar system 106 relative to the autonomous vehicle 102, etc.) to identify that the radar system 106 of the autonomous vehicle 102 and the radar system 108 of the autonomous vehicle 104 are likely to experience cross-radar interference during the time period.

Pursuant to another example, the interference analysis component 210 can additionally or alternatively identify actual instances of cross-radar interference between radar systems. Thus, the techniques described herein can be applied to such scenarios of actual cross-radar interference.

The mode selection component 212 can select radar system(s) to operate in the active mode and radar system(s) to operate in the passive mode. Continuing the foregoing example, the mode selection component 212 can select the radar system 106 of the autonomous vehicle 102 to operate in the active mode and the radar system 108 of the autonomous vehicle 104 to operate in the passive mode during the time period. The mode selection component 212 can cause the server computing system 202 to transmit, to the autonomous vehicle 104, a control signal to cause the radar system 108 to operate in the passive mode during the time period. Moreover, the mode selection component 212 can cause the server computing system 202 to transmit, to the autonomous vehicle 102, a control signal to cause the radar system 106 to operate in the active mode during the time period. However, according to another example, it is contemplated that a control signal need not be sent to cause a radar system to operate in the active mode (e.g., a radar system can default to operate in the active mode unless a control signal is received causing the radar system to operate in the passive mode).

The data store 208 can further include transmission information 214. The transmission information 214 can include location information specifying locations of the radar systems 106-108, waveform information specifying waveforms of radar signals transmitted by the radar systems 106-108, timing information specifying timing of the radar signals transmitted by the radar systems 106-108, and so forth.

According to an example, the interference analysis component 210 can identify that the radar systems 106-108 are likely to experience cross-radar interference during a time period based on at least some of the transmission information 214 retained in the data store 208.

Pursuant to a further example, the mode selection component 212 can cause the server computing system 202 to transmit at least some of the transmission information 214 to one or more of the autonomous vehicles 102-104. Reference is again made to the example above where the mode selection component 212 selects the radar system 106 of the autonomous vehicle 102 to operate in the active mode and the radar system 108 of the autonomous vehicle 104 to operate in the passive mode during the time period. Following this example, the mode selection component 212 can further cause the server computing system 202 to transmit, to the autonomous vehicle 104, transmission information 214 pertaining to the radar system 106 of the autonomous vehicle 102. Thus, the transmission information 214 pertaining to the radar system 106 operating in the active mode can be provided to the autonomous vehicle 104 including the radar system 108 operating in the passive mode during the time period. Such transmission information 214 can be utilized by the radar system 108 operating in the passive mode to detect object(s) from received radar signals. As noted above, the transmission information 214 pertaining to the radar system 106 operating in the active mode, which can be provided to the radar system 108 operating in the passive mode, can include location information specifying a location of the radar system 106, waveform information specifying a waveform of a radar signal transmitted by radar system 106, and/or timing information specifying timing of the radar signal transmitted by the radar system 106.

According to another example, it is contemplated that the mode selection component 212 can control a power level of a radar system operating in active mode. Thus, a control signal sent to the radar system operating in the active mode can further specify the power level at which the radar system is to transmit a radar signal.

The autonomous vehicle 102 is now described in greater detail. It is contemplated that the autonomous vehicle 104 (as well as other autonomous vehicle(s)) can be substantially similar to the autonomous vehicle 102 (e.g., the radar system 108 as well as other radar system(s) can be substantially similar to the radar system 106). The radar system 106 includes a transmitter 216 and a receiver 218. When the radar system 106 of the autonomous vehicle 102 operates in the active mode, the transmitter 216 and the receiver 218 of the radar system 106 are both enabled. Moreover, when the radar system 106 of the autonomous vehicle 102 operates in the passive mode, the receiver 218 of the radar system 106 is enabled and the transmitter 216 of the radar system 106 is disabled. When enabled, the transmitter 216 can transmit a radar signal into an environment; the transmitter 216 does not transmit a radar signal when disabled. Moreover, the receiver 218 can receive a radar signal from the environment regardless of whether the transmitter 216 is enabled. The radar system 108 of the autonomous vehicle 104 (as well as other radar system(s) of other autonomous vehicle(s)) can also include a transmitter and a receiver, which can operate in a similar manner as compared to the radar system 106.

The autonomous vehicle 102 further includes the computing system 114 in communication with the radar system 106. The computing system 114 includes a processor 220 and memory 222; the memory 222 includes computer-executable instructions that are executed by the processor 220. Pursuant to various examples, the processor 220 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like. The memory 222 includes the radar control system 116, which controls operation of the radar system 106. While the computing system 114 can be separate from, but in communication with the radar system 106, in other embodiments it is contemplated that the radar system 106 can include the computing system 114 (e.g., the radar system 106 can include the radar control system 116).

The radar control system 116 can include a transmitter control component 224 and a signal processing component 226. The transmitter control component 224 is configured to control the radar system 106 to operate in one of the active mode or the passive mode during a given time period. For example, the transmitter control component 224 can control the radar system 106 to operate in the active mode during the given time period; thus, the transmitter control component 224 can enable both the transmitter 216 and the receiver 218 of the radar system 106 during the given time period. According to another example, the transmitter control component 224 can control the radar system 106 to operate in the passive mode during the given time period; accordingly, the transmitter control component 224 can enable the receiver 218 and disable the transmitter 216 during the given time period.

The receiver 218 can receive a radar signal from the driving environment. The received radar signal can be responsive to a radar signal transmitted by the transmitter 216 of the radar system 106 (if enabled by the transmitter control component 224) and/or responsive to a radar signal transmitted by transmitter(s) of differing radar system(s) (e.g., the radar system 108). The signal processing component 226 can detect an object in the driving environment based on the radar signal received by the receiver 218 of the radar system 106.

According to an illustration, when the transmitter control component 224 causes the radar system 106 to operate in the active mode, the transmitter 216 transmits a radar signal into the driving environment. The radar signal propagates from the transmitter 216 and can reflect off an object such that a reflected radar signal can be received by the receiver 218. The signal processing component 226 can detect the object based on the reflected radar signal.

Pursuant to another illustration, when the transmitter control component 224 causes the radar system 106 to operate in the passive mode, the transmitter 216 is inhibited from transmitting. Rather, a reflected radar signal responsive to a radar signal transmitted by the radar system 108 of the autonomous vehicle 104 can be received by the receiver 218 of the radar system 106. For instance, the radar signal transmitted by the radar system 108 can be reflected by an object in the driving environment, and the reflected radar signal can propagate to the receiver 218 of the radar system 106. The signal processing component 226 can detect the object in the driving environment based on the reflected radar signal and the transmission information pertaining to the radar system 108 of the autonomous vehicle 104. The signal processing component 226 can utilize timing information and waveform information pertaining to the radar signal transmitted by the radar system 108 of the autonomous vehicle 104 as well as location information of the radar system 108 and location information of the radar system 106 to detect the object based on the reflected radar signal received by the receiver 218. By having the waveform information used by the radar system 108 of the autonomous vehicle 104, the signal processing component 226 can have a priori knowledge that can be utilized to detect the object from the reflected radar signal. For example, the signal processing component 226 can output data specifying a location of the object, velocity of the object, direction of movement of the object, and so forth.

Moreover, it is to be appreciated that the mode in which the radar systems 106-108 operate can change over time. Again reference is made to the example above where the mode selection component 212 selects the radar system 106 of the autonomous vehicle 102 to operate in the active mode and the radar system 108 of the autonomous vehicle 104 to operate in the passive mode during the time period. During a differing time period, the mode selection component 212 can select the radar system 106 of the autonomous vehicle 102 to operate in the passive mode as the autonomous vehicle 102 travels along the route through the driving environment. Thus, the mode selection component 212 can cause the radar system 106 of the autonomous vehicle 102 to switch from the active mode to the passive mode. The mode selection component 212 can further cause the server computing system 202 to transmit, to the autonomous vehicle 102, a control signal to cause the radar system 106 to operate in the passive mode during the differing time period. The mode selection component 212 can also cause the server computing system 202 to transmit, to the autonomous vehicle 102, transmission information 214 pertaining to the radar system 108 of the autonomous vehicle 104. The transmitter control component 224 can control the radar system 106 to operate in the passive mode as described herein responsive to receipt of such control signal.

Additionally or alternatively, during the differing time period, the mode selection component 212 can select the radar system 108 of the autonomous vehicle 104 to operate in the active mode as the autonomous vehicle 104 travels along the route through the driving environment (e.g., the radar system 108 can be switched from the passive mode to the active mode). The mode selection component 212 can further cause the server computing system 202 to transmit, to the autonomous vehicle 104, a control signal to cause the radar system 108 to operate in the active mode during the differing time period.

Further, it is contemplated that the radar system 106 of the autonomous vehicle 102 and the radar system 108 of the autonomous vehicle 104 can both operate in the active mode when cross-radar interference is not likely to be experienced by either of the radar systems 106 and 108.

Figure 3:
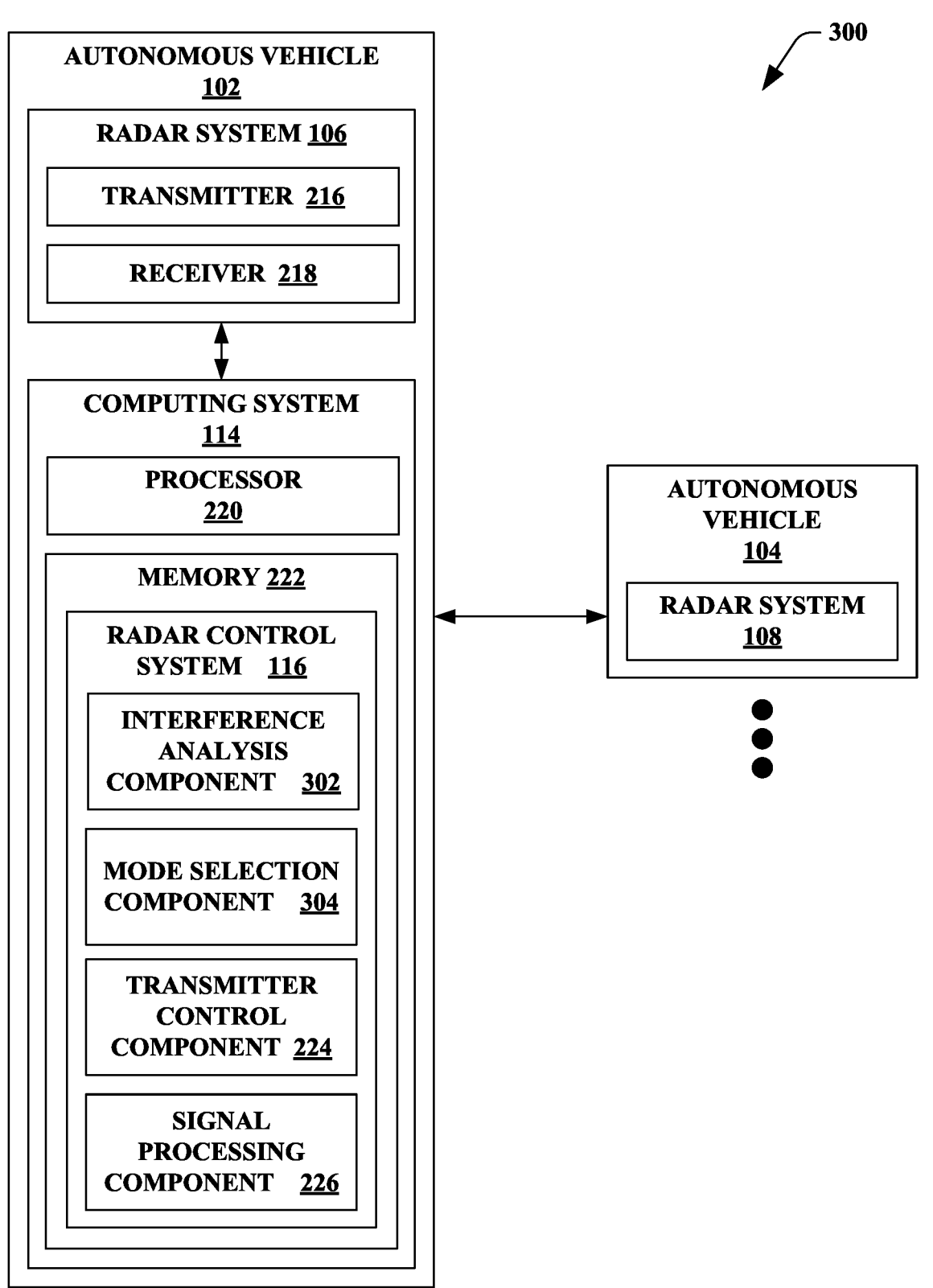
FIG. 3 illustrates a block diagram of an exemplary system in which opportunistic passive multistatic radar processing within a fleet of autonomous vehicles is managed by the autonomous vehicles.

With reference to FIG. 3, illustrated is an exemplary system 300 in which opportunistic passive multistatic radar processing within a fleet of autonomous vehicles 102-104 is managed by the autonomous vehicles 102-104. The system 300 includes the autonomous vehicle 102 and the autonomous vehicle 104; however, it is again contemplated that the system 300 can include more than two autonomous vehicles 102-104. Moreover, while the autonomous vehicle 102 is described in detail, it is contemplated that other autonomous vehicle(s) in the system 300 (e.g., the autonomous vehicle 104) can be substantially similar to the autonomous vehicle 102.

As described above, the autonomous vehicle 102 includes the radar system (including the transmitter 216 and the receiver 218) and the computing system 114 (including the processor 220 and memory 222). The memory 222 includes the radar control system 116. In the example of FIG. 3, the radar control system 116 includes an interference analysis component 302 (e.g., the interference analysis component

210) and a mode selection component 304 (e.g., the mode selection component 212). Moreover, the radar control system 116 of FIG. 3 again includes the transmitter control component 224 and the signal processing component 226. Accordingly, the autonomous vehicle 102 and the autonomous vehicle 104 can control whether the respective radar systems 106 and 108 are to operate in the active mode or the passive mode (rather than being controlled by a server computing system) in the example of FIG. 3. Thus, vehicle-to-vehicle communications can be exchanged between the autonomous vehicle 102 and the autonomous vehicle 104 (as well as other autonomous vehicle(s) that are nearby) to enable such control of the respective radar systems 106 and 108. The transmitter control component 224 and the signal processing component 226 can operate in a similar manner as described above responsive to a mode of the radar system 116 being selected by the mode selection component 304.

The interference analysis component 302 is configured to identify whether the radar system 106 of the autonomous vehicle 102 and a differing radar system of a differing autonomous vehicle are likely to experience cross-radar interference during a given time period as the autonomous vehicle 102 and the differing autonomous vehicle travel along respective routes. Similar to the interference analysis component 210 of the server computing system 202 of FIG. 2, the interference analysis component 302 can identify that the radar system 106 of the autonomous vehicle 102 and the differing radar system of the differing autonomous vehicle are likely to experience cross-radar interference during the given time period based on a distance between the radar systems (e.g., a distance between the radar system 106 and the radar system 108), a field of view of the radar system 106 (e.g., whether the radar system 108 is within the field of view of the radar system 106 during the given time period), etc. Accordingly, the interference analysis component 302 can receive location information pertaining to differing radar system(s) of differing autonomous vehicle(s), orientation information of such differing radar system(s), and the like (e.g., such information can be received from the differing autonomous vehicles, from a server computing system such as the server computing system 202, etc.). Pursuant to an illustration, the interference analysis component 302 can identify that the radar system 106 and the radar system 108 of the autonomous vehicle 104 are likely to experience cross-radar interference during the given time period.

Moreover, the mode selection component 304 is configured to select a mode (e.g., active mode or passive mode) of the radar system 106 for the given time period responsive to the interference analysis component 302 identifying that cross-radar interference is likely to be experienced. The mode selection component 304 can also select mode(s) of the other radar system(s) with which the radar system 106 is likely to experience cross-radar interference during the given time period. For instance, the mode selection component 304 can exchange messages with mode selection component(s) of the other radar system(s) of the other autonomous vehicle(s) (e.g., a mode selection component of the autonomous vehicle 104) to coordinate the modes selected for the radar system 106 and the other radar system(s) that are likely to experience cross-radar interference during the time period. Thus, following the illustration above where the interference analysis component 302 identifies that the radar system 106 and the radar system 108 of the autonomous vehicle 104 are likely to experience cross-radar interference during the given time period, the mode selection component 304 can select the radar system 106 to operate in one of active mode or passive mode and can select the radar system 108 to operate in the other one of active mode or passive mode during the given time period. Further, it is contemplated that the mode selection component 304 can cause the mode of the radar system 106 to change during differing time periods.

According to an example, when the mode selection component 304 causes the radar system 106 to operate in the active mode and the radar system 108 is to operate in the passive mode, the mode selection component 304 can cause the autonomous vehicle 102 to send transmission information to the autonomous vehicle 104. The transmission information sent from the autonomous vehicle pertains to the radar system 106 and can be utilized by a signal processing component of the autonomous vehicle 104 to detect object(s) based on radar signal(s) received by the radar system 108 while the radar system 108 is operating in the passive mode. Similar to above, the transmission information can include location information specifying a location of the radar system 106, waveform information specifying a waveform of a radar signal transmitted by the transmitter 216, timing information specifying timing of the radar signal transmitted by the transmitter 216, and so forth.

Figure 4:
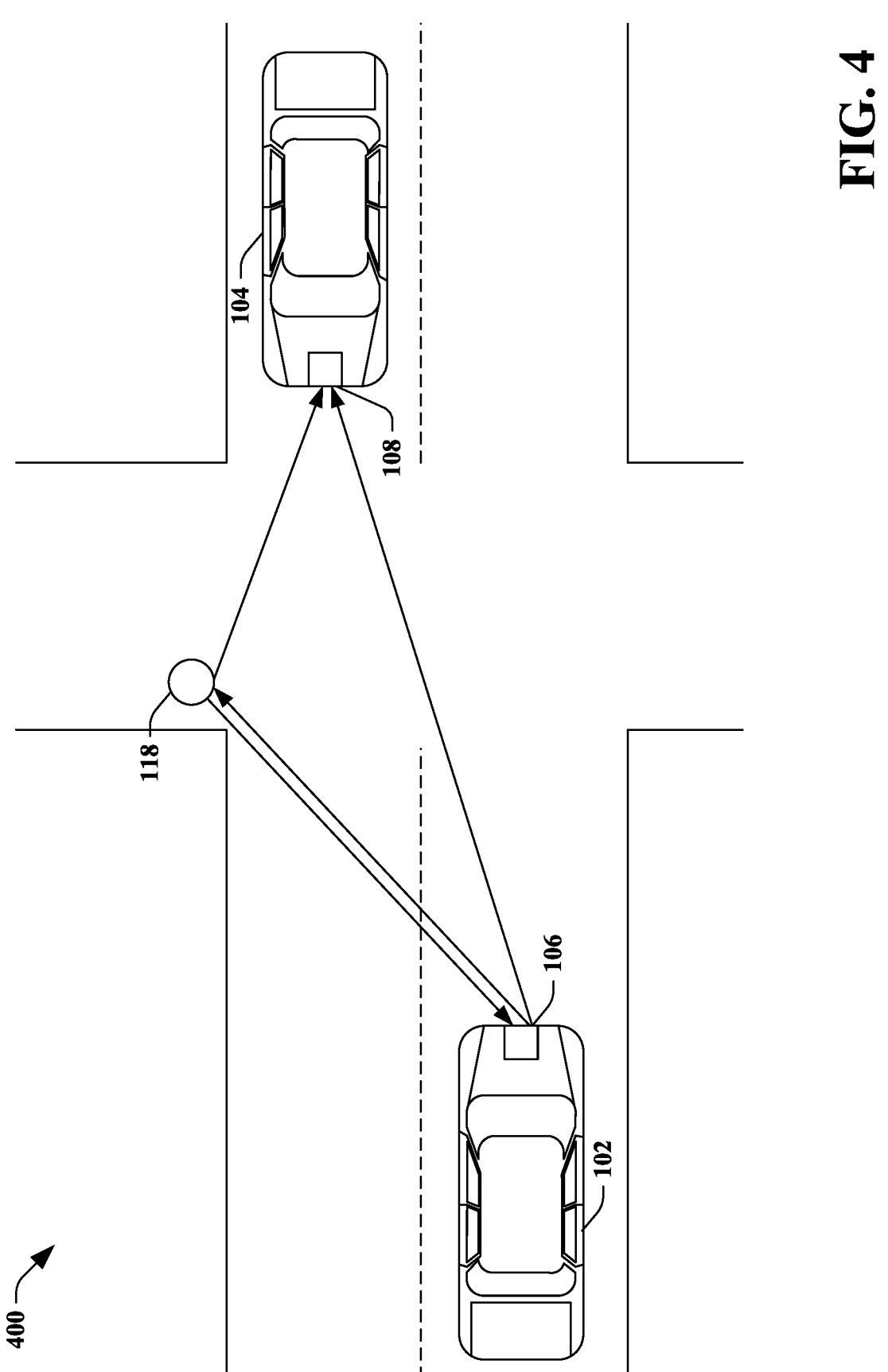
FIG. 4 illustrates an exemplary driving environment including autonomous vehicles having radar systems that opportunistically employ passive multistatic radar processing.

Now referring to FIG. 4, illustrated is an exemplary driving environment 400 (e.g., the driving environment 100) that includes the autonomous vehicle 102 and the autonomous vehicle 104. As depicted, the radar system 106 of the autonomous vehicle 102 and the radar system 108 of the autonomous vehicle 104 are nearby each other and oriented relative to each other such that the radar systems 106-108 would likely experience cross-radar interference while in such relative positions in the driving environment 400 and while traveling along respective routes. In the example shown in FIG. 4, the radar system 106 of the autonomous vehicle 102 operates in the active mode and the radar system 108 of the autonomous vehicle 104 operates in the passive mode during a time period.

Various techniques can be employed to select which radar system is to be in the active mode and which radar system is to be in the passive mode. The following are various exemplary techniques that can be employed by a mode selection component; the mode selection component can be the mode selection component 212 of the server computing system 202 and/or the mode selection component 304 of the autonomous vehicle 102 (as well as a mode selection component of the autonomous vehicle 104 and mode selection component(s) of other autonomous vehicles that are nearby the autonomous vehicle 102). It is contemplated that a combination of the following techniques can be utilized by the mode selection component.

According to an example, the mode selection component can select the modes for the radar systems based on a vehicle decision priority. The mode selection component can select the modes of the radar systems such that an autonomous vehicle making a more challenging maneuver (e.g., from a safety perspective, based on a maneuver score, etc.) is prioritized in the assignment of the modes. It is contemplated that active mode or passive mode can be prioritized in different scenarios (e.g., active mode can be prioritized for a first maneuver type, passive mode can be prioritized for a second maneuver type). For instance, the mode selection component can select the radar system 106 of the autonomous vehicle 102 to operate in the active mode and the radar system 108 of the autonomous vehicle 104 to operate in the passive mode during the time period based on relative priorities of driving maneuvers to be performed by the autonomous vehicle 102 and the autonomous vehicle 104. According to an illustration, the autonomous vehicle 102 can be traveling along a route where a maneuver to be performed is a left turn, and the autonomous vehicle 104 can be traveling along a route where a maneuver to be performed is continuing to travel straight. Following this illustration, the left turn of the autonomous vehicle 102 can be prioritized over the traveling straight of the autonomous vehicle 104, leading to the mode selection component selecting the modes as shown in FIG. 4.

Pursuant to another example, the mode selection component can select the modes for the radar systems based on a relative locations of the radar systems and desired detection directions. For instance, the mode selection component can select the radar system 106 of the autonomous vehicle 102 to operate in the active mode and the radar system 108 of the autonomous vehicle 104 to operate in the passive mode during the time period based on relative locations of the radar system 106 and the radar system 108 and directions towards which it is desired to detect objects from the radar system 106 and the radar system 108. According to an example, detection of an object (e.g., the object 118) can be poor along a direct path from an active radar system of an autonomous vehicle to a passive radar system of a differing autonomous vehicle. If it is desired for a given autonomous vehicle to see in a direction of the differing autonomous vehicle to enable a maneuver to be performed by the given autonomous vehicle, then the radar system of the given autonomous vehicle can be prioritized for being in the active mode.

According to a further example, the mode selection component can select the modes for the radar systems based on an estimate of information that is obtainable from a target depending on the mode. Pursuant to an illustration, the mode selection component can select the radar system 106 of the autonomous vehicle 102 to operate in the active mode and the radar system 108 of the autonomous vehicle 104 to operate in the passive mode during the time period based on an estimate of information obtained from a target from bistatic measurement. For instance, measured Doppler from radar is along a different vector for multistatic versus monostatic radar (e.g., when operating in passive mode versus active mode), which can provide additional information. Each target in the driving environment 400 can be assigned an information level value in the respective routes of each of the autonomous vehicles if the radar system were to be in the passive mode. The amount of additional information from a bistatic measurement can be estimated in each case, and the mode selection component can select the modes for the radar systems based on the amount of additional information (e.g., maximize information across the fleet).

In yet another example, the mode selection component can select the modes for the radar systems based on coverage from radar systems of multiple autonomous vehicles. For instance, if a particular autonomous vehicle drives a route where it can receive illumination from multiple other autonomous vehicles, then a radar system of the particular autonomous vehicle can be more likely to be in the passive mode. Pursuant to an illustration, the mode selection component can select the radar system 106 of the autonomous vehicle 102 to operate in the active mode and the radar system 108 of the autonomous vehicle 104 to operate in the passive mode during the time period based on respective numbers of radar systems of differing autonomous vehicles in the fleet of autonomous vehicles from which radar signals are receivable by the radar system 106 and the radar system 108.

Figure 5:
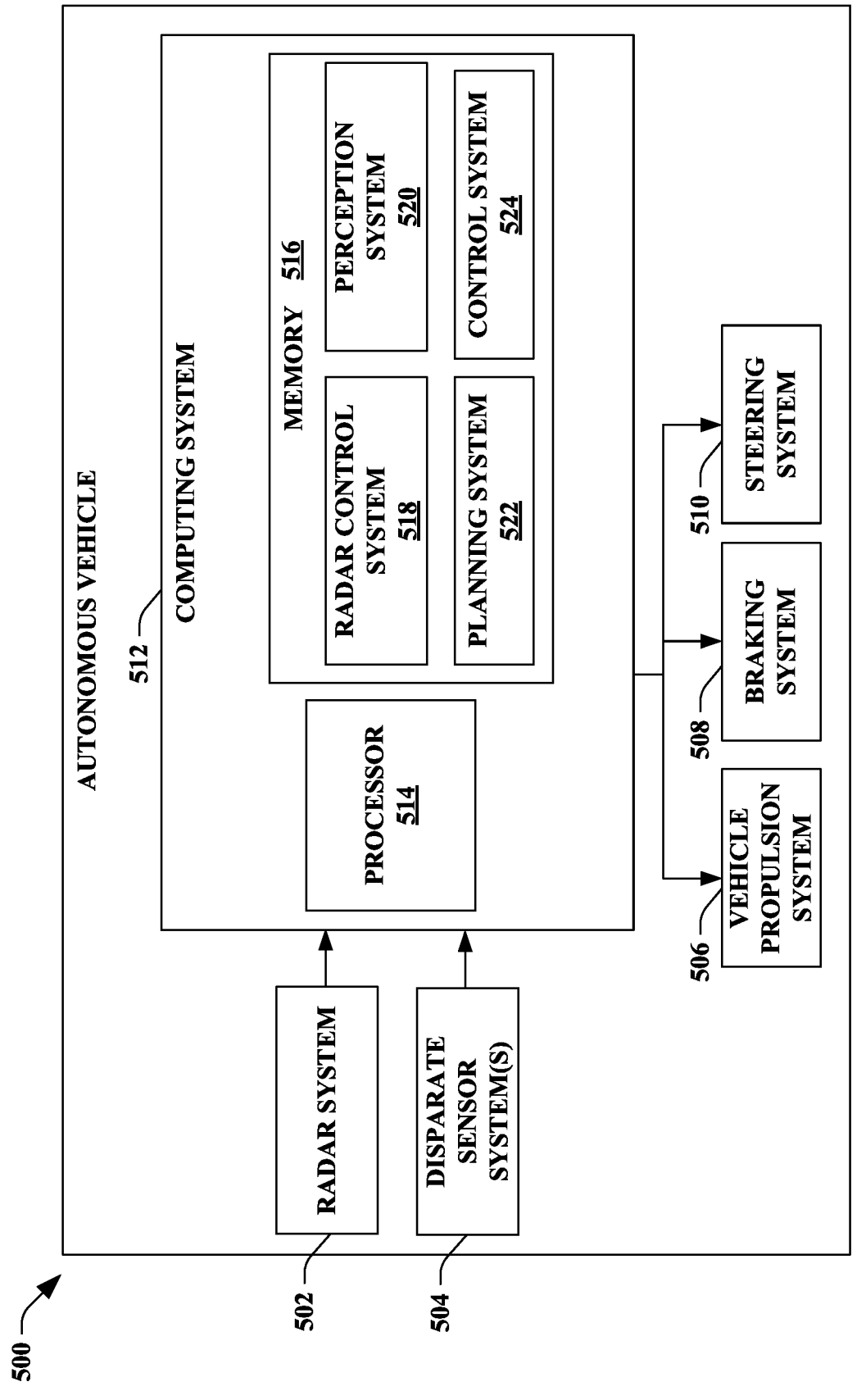
FIG. 5 illustrates a functional block diagram of an exemplary autonomous vehicle.

Turning to FIG. 5, illustrated is an autonomous vehicle 500 (e.g., the autonomous vehicle 102, the autonomous vehicle 104). The autonomous vehicle 500 can navigate about roadways without human conduction based upon sensor signals outputted by sensor systems of the autonomous vehicle 500. The autonomous vehicle 500 includes a plurality of sensor systems. More particularly, the autonomous vehicle 500 includes a radar system 502 (e.g., the radar system 106, the radar system 108). The autonomous vehicle 500 can further include one or more disparate sensor systems 504. The disparate sensor systems 504 can include GPS system(s), ultrasonic sensor(s), infrared system(s), camera system(s), lidar system(s), additional radar system(s), and the like. The sensor systems 502 and 504 can be arranged about the autonomous vehicle 500.

The autonomous vehicle 500 further includes several mechanical systems (e.g., the mechanical system 112) that are used to effectuate appropriate motion of the autonomous vehicle 500. For instance, the mechanical systems can include, but are not limited to, a vehicle propulsion system 506, a braking system 508, and a steering system 510. The vehicle propulsion system 506 may be an electric engine or a combustion engine. The braking system 508 can include an engine brake, brake pads, actuators, and/or any other suitable componentry that is configured to assist in decelerating the autonomous vehicle 500. The steering system 510 includes suitable componentry that is configured to control the direction of movement of the autonomous vehicle 500.

The autonomous vehicle 500 additionally includes a computing system 512 (e.g., the computing system 114) that is in communication with the sensor systems 502 and 504, the vehicle propulsion system 506, the braking system 508, and the steering system 510. The computing system 512 includes a processor 514 and memory 514 (e.g., the processor 220 and memory 222); the memory 514 includes computer-executable instructions that are executed by the processor 514. Pursuant to various examples, the processor 514 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The memory 516 of the computing system 512 can include a radar control system 518 (e.g., the radar control system 116), a localization system 518, a perception system 520, a planning system 522, and a control system 524. The radar control system 518 is configured to control the radar system 502 (e.g., control whether the radar system 502 operates in passive or active mode). The radar control system 518 can also be configured to control other radar system(s) of the autonomous vehicle 500 (e.g., the disparate sensor system(s) 504 can include the other radar system(s)). The localization system 518 can be configured to determine a local position of the autonomous vehicle 500. The perception system 520 can be configured to perceive objects nearby the autonomous vehicle 500 (e.g., based on outputs from the sensor systems 502 and 504). For instance, the perception system 520 can detect, classify, and predict behaviors of objects nearby the autonomous vehicle 500. The perception system 520 (and/or differing system(s) included in the memory 516) can track the objects nearby the autonomous vehicle 500 and/or make predictions with respect to the environment in which the autonomous vehicle 500 is operating (e.g., predict the behaviors of the objects nearby the autonomous vehicle 500). Further, the planning system 522 can plan motion of the autonomous vehicle 500. Moreover, the control system 524 can be configured to control at least one of the mechanical systems of the autonomous vehicle 500 (e.g., at least one of the vehicle propulsion system 506, the braking system 508, and/or the steering system 510).

An operation of the autonomous vehicle 500 can be controlled by the computing system 512 based at least in part on output data generated by the radar system 502, which can be opportunistically operated in the passive mode or the active mode so as to mitigate cross-radar interference as controlled by the radar control system 518. While the radar system 502 and the radar control system 518 are described as being included as part of the autonomous vehicle 500 in FIG. 5, it is contemplated that the radar system 502 and the radar control system 518 can be utilized in other types of scenarios (e.g., included in other types of systems, etc.). Moreover, in other embodiments, it is contemplated that the radar system 502 can include the radar control system 518 (e.g., the radar system 502 can include a computing system that includes the radar control system 518).

Figure 7:
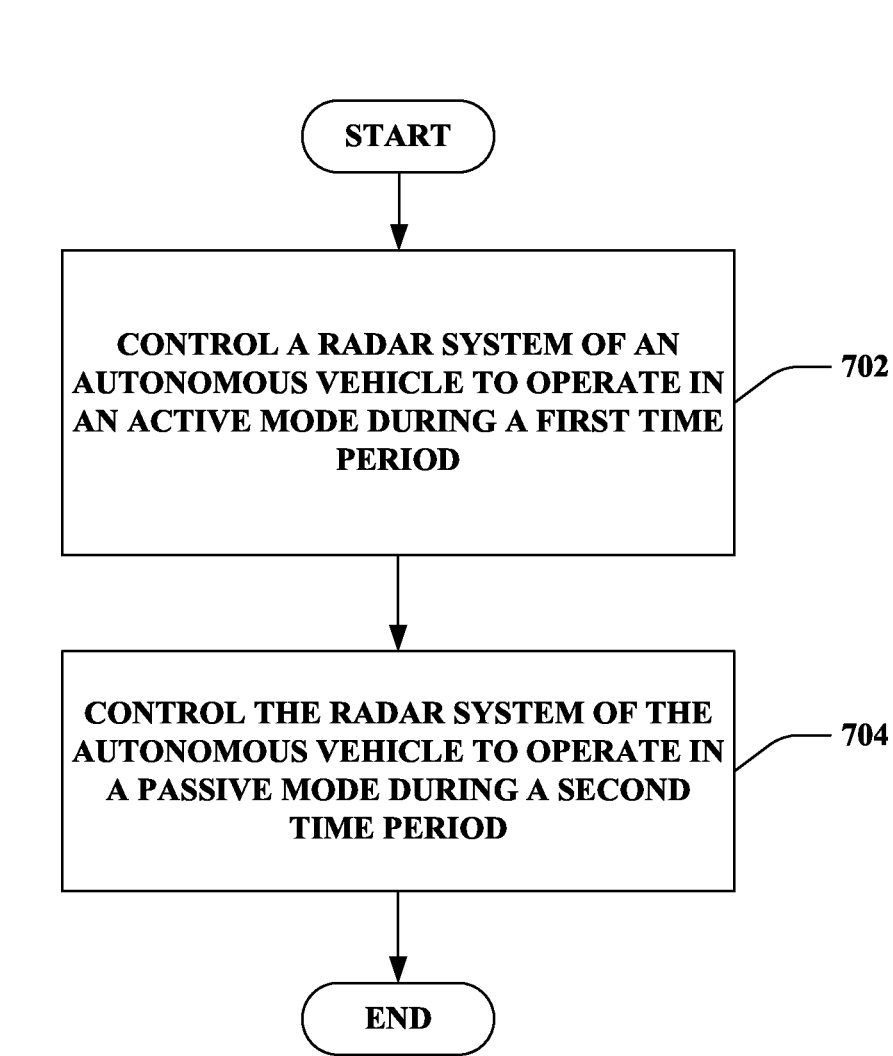
FIG. 7 is a flow diagram that illustrates an exemplary methodology of controlling operation of a radar system of an autonomous vehicle.

FIGS. 6-7 illustrate exemplary methodologies relating to opportunistically employing passive multistatic radar processing in automotive radar systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of opportunistically controlling passive multistatic radar processing of radar systems of autonomous vehicles. At 602, a first radar system of a first autonomous vehicle and a second radar system of a second radar system can be identified as likely to experience cross-radar interference during a time period. Such identification can be made as the first autonomous vehicle travels along a first route through a driving environment and the second autonomous vehicle travels along a second route through the driving environment. Further, the first autonomous vehicle and the second autonomous vehicle are in a fleet of autonomous vehicles. At 604, the first radar system of the first autonomous vehicle can be selected to operate in an active mode during the time period. Moreover, the second radar system of the second autonomous vehicle can be selected to operate in a passive mode during the time period. A first transmitter and a first receiver of the first radar system of the first autonomous vehicle are both enabled when operating in the active mode. Moreover, a second transmitter of the second radar system is disabled and a second received of the second autonomous vehicle is enabled when operating in the passive mode. At 606, a control signal can be transmitted to the second autonomous vehicle. The control signal can cause the second radar system to operate in the passive mode during the time period. Further, for example, a control signal can be transmitted to the first autonomous vehicle causing the first autonomous vehicle to operate in the active mode during the time period. Moreover, transmission information pertaining to the first radar system of the first autonomous vehicle (operating in the active mode) can be transmitted to the second autonomous vehicle (operating in the passive mode).

With reference to FIG. 7, illustrated is a methodology 700 of controlling operation of a radar system of an autonomous vehicle. At 702, the radar system of the autonomous vehicle can be controlled to operate in an active mode during a first time period as the autonomous vehicle travels along a route through a driving environment. A transmitter and a receiver of the radar system are both enabled when operating in the active mode. At 704, the radar system is controlled to operate in a passive mode during a second time period as the autonomous vehicle travels along the route through the driving environment. The transmitter of the radar system is disabled and the receiver of the radar system is enabled when operating in the passive mode.

Referring now to FIG. 8, a high-level illustration of an exemplary computing device 800 that can be used in accordance with the systems and methodologies disclosed herein is illustrated. For instance, the computing device 800 may be or include the computing system 512. According to another example, the computing device 800 may be or include the computing system 114. The computing device 800 includes at least one processor 802 that executes instructions that are stored in a memory 804. The instructions may be, for instance, instructions for implementing functionality described as being carried out by one or more systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store radar data, transmission information, and so forth.

The computing device 800 additionally includes a data store 808 that is accessible by the processor 802 by way of the system bus 806. The data store 808 may include executable instructions, radar data, transmission information, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 506, the braking system 508, and/or the steering system 510 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a server computing system is described herein. The server computing system includes a processor and memory that stores computer-executable instructions that, when executed by the processor, cause the processor to perform acts. The acts include identifying that a first radar system of a first autonomous vehicle and a second radar system of a second autonomous vehicle are likely to experience cross-radar interference during a time period as the first autonomous vehicle travels along a first route through a driving environment and the second autonomous vehicle travels along a second route through the driving environment, where the first autonomous vehicle and the second autonomous vehicle are in a fleet of autonomous vehicles. The acts also include selecting the first radar system of the first autonomous vehicle to operate in an active mode and the second radar system of the second autonomous vehicle to operate in a passive mode during the time period, where a first transmitter and a first receiver of the first radar system of the first autonomous vehicle are both enabled when operating in the active mode, and where a second transmitter of the second radar system of the second autonomous vehicle is disabled and a second receiver of the second radar system of the second autonomous vehicle is enabled when operating in the passive mode. Moreover, the acts include transmitting, to the second autonomous vehicle, a control signal to cause the second radar system to operate in the passive mode during the time period.

(A2) In some embodiments of the server computing system of (A1), the acts further include transmitting, to the first autonomous vehicle, a control signal to cause the first radar system to operate in the active mode during the time period.

(A3) In some embodiments of at least one of the server computing systems of (A1)-(A2), the acts further include transmitting, to the second autonomous vehicle, transmission information pertaining to the first radar system of the first autonomous vehicle.

(A4) In some embodiments of the server computing system of (A3), the transmission information pertaining to the first radar system includes location information specifying a location of the first radar system.

(A5) In some embodiments of at least one of the server computing systems of (A3)-(A4), the transmission information pertaining to the first radar system includes at least one of waveform information specifying a waveform of a radar signal transmitted by the first transmitter of the first radar system or timing information specifying timing of the radar signal transmitted by the first transmitter of the first radar system.

(A6) In some embodiments of at least one of the server computing systems of (A1)-(A5), the first radar system of the first autonomous vehicle and the second radar system of the second autonomous vehicle are identified as likely to experience cross-radar interference based on a distance between the first radar system and the second radar system, a first field of view of the first radar system, and a second field of view of the second radar system.

(A7) In some embodiments of at least one of the server computing systems of (A1)-(A6), the first radar system of the first autonomous vehicle is selected to operate in the active mode and the second radar system of the second autonomous vehicle is selected to operate in the passive mode during the time period based on relative priorities of driving maneuvers to be performed by the first autonomous vehicle and the second autonomous vehicle.

(A8) In some embodiments of at least one of the server computing systems of (A1)-(A7), the first radar system of the first autonomous vehicle is selected to operate in the active mode and the second radar system of the second autonomous vehicle is selected to operate in the passive mode during the time period based on relative locations of the first radar system and the second radar system and directions towards which it is desired to detect objects from the first radar system and the second radar system.

(A9) In some embodiments of at least one of the server computing systems of (A1)-(A8), the first radar system of the first autonomous vehicle is selected to operate in the active mode and the second radar system of the second autonomous vehicle is selected to operate in the passive mode during the time period based on an estimate of information obtained from a target from bistatic measurement.

(A10) In some embodiments of at least one of the server computing systems of (A1)-(A9), the first radar system of the first autonomous vehicle is selected to operate in the active mode and the second radar system of the second autonomous vehicle is selected to operate in the passive mode during the time period based respective numbers of radar systems of differing autonomous vehicles in the fleet of autonomous vehicles from which radar signals are receivable by the first radar system and the second radar system.

(A11) In some embodiments of at least one of the server computing systems of (A1)-(A10), the acts further include: selecting the first radar system of the first autonomous vehicle to operate in the passive mode during a differing time period as the first autonomous vehicle travels along the first route through the driving environment, where the first transmitter of the first radar system of the first autonomous vehicle is disabled and the first receiver of the first radar system of the first autonomous vehicle is enabled when operating in the passive mode; and transmitting, to the first autonomous vehicle, a control signal to cause the first radar system to operate in the passive mode during the differing time period.

(A12) In some embodiments of at least one of the server computing systems of (A1)-(A11), the acts further include: selecting the second radar system of the second autonomous vehicle to operate in the active mode during a differing time period as the second autonomous vehicle travels along the second route through the driving environment, where the second transmitter and the second receiver of the second radar system of the second autonomous vehicle are both enabled when operating in the active mode; and transmitting, to the second autonomous vehicle, a control signal to cause the second radar system to operate in the active mode during the differing time period.

(B1) In another aspect, an autonomous vehicle that includes a radar system and a computing system is described herein. The radar system includes a transmitter and a receiver. The computing system is in communication with the radar system and includes a processor and memory, where the memory stores computer-executable instructions that, when executed by the processor, cause the processor to perform acts. The acts include controlling the radar system to operate in an active mode during a first time period as the autonomous vehicle travels along a route through a driving environment, where the transmitter and the receiver of the radar system are both enabled when operating in the active mode. Moreover, the acts include controlling the radar system to operate in a passive mode during a second time period as the autonomous vehicle travels along the route through the driving environment, where the transmitter of the radar system is disabled and the receiver of the radar system is enabled when operating in the passive mode.

(B2) In some embodiments of the autonomous vehicle of (B1), the acts further include: receiving, from a server computing system, a first control signal that causes the radar system to operate in the active mode during the first time period, where the radar system is controlled to operate in the active mode during the first time period responsive to the first control signal; and receiving, from the server computing system, a second control signal that causes the radar system to operate in the passive mode during the second time period, where the radar system is controlled to operate in the passive mode during the second time period responsive to the second control signal.

(B3) In some embodiments of at least one of the autonomous vehicles of (B1)-(B2), the acts further include receiving transmission information pertaining to a differing radar system of a differing autonomous vehicle, where the differing radar system of the differing autonomous vehicle operates in the active mode during the second time period, and where the differing radar system transmits a radar signal during the second time period.

(B4) In some embodiments of the autonomous vehicle of (B3), the transmission information pertaining to the differing radar system of the differing autonomous vehicle includes at least one of location information specifying a location of the differing radar system, waveform information specifying a waveform of the radar signal transmitted by the differing radar system, or timing information specifying timing of the radar signal transmitted by the differing radar system.

(B5) In some embodiments of at least one of the autonomous vehicles of (B3)-(B4), the acts further include: receiving a reflected radar signal via the receiver of the radar system during the second time period while the radar system is operating in the passive mode; and detecting an object in the driving environment based on the reflected radar signal and the transmission information pertaining to the differing radar system of the differing autonomous vehicle.

(B6) In some embodiments of at least one of the autonomous vehicles of (B1)-(B5), the acts further include: identifying that the radar system and a differing radar system of a differing autonomous vehicle are likely to experience cross-radar interference during the first time period; and selecting the radar system of the autonomous vehicle to operate in the active mode and the differing radar system of the differing autonomous vehicle to operate in the passive mode during the first time period.

(B7) In some embodiments of at least one of the autonomous vehicles of (B1)-(B6), the acts further include: identifying that the radar system and a differing radar system of a differing autonomous vehicle are likely to experience cross-radar interference during the second time period; and selecting the radar system of the autonomous vehicle to operate in the passive mode and the differing radar system of the differing autonomous vehicle to operate in the active mode during the second time period.

(C1) In another aspect, a method of operating a radar system of an autonomous vehicle is described herein. The method includes controlling the radar system to operate in an active mode during a first time period as the autonomous vehicle travels along a route through a driving environment, where a transmitter and a receiver of the radar system are both enabled when operating in the active mode. The method further includes controlling the radar system to operate in a passive mode during a second time period as the autonomous vehicle travels along the route through the driving environment, where the transmitter of the radar system is disabled and the receiver of the radar system is enabled when operating in the passive mode.

(C2) In some embodiments of the method of (C1), the method further includes receiving, from a server computing system, a first control signal that causes the radar system to operate in the active mode during the first time period, wherein the radar system is controlled to operate in the active mode during the first time period responsive to the first control signal; and receiving, from the server computing system, a second control signal that causes the radar system to operate in the passive mode during the second time period, wherein the radar system is controlled to operate in the passive mode during the second time period responsive to the second control signal.

(C3) In some embodiments of at least one of the methods of (C1)-(C2), the method further includes identifying that the radar system and a differing radar system of a differing autonomous vehicle are likely to experience cross-radar interference during the first time period; and selecting the radar system of the autonomous vehicle to operate in the active mode and the differing radar system of the differing autonomous vehicle to operate in the passive mode during the first time period.

(C4) In some embodiments of at least one of the methods of (C1)-(C3), the method further includes identifying that the radar system and a differing radar system of a differing autonomous vehicle are likely to experience cross-radar interference during the second time period; and selecting the radar system of the autonomous vehicle to operate in the passive mode and the differing radar system of the differing autonomous vehicle to operate in the active mode during the second time period.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing system, comprising:
a processor; and
memory that stores computer-executable instructions that, when executed by the processor, cause the processor to perform acts comprising:
identifying that a first radar system of a first autonomous vehicle and a second radar system of a second autonomous vehicle are likely to experience cross-radar interference during a time period as the first autonomous vehicle travels along a first route through a driving environment and the second autonomous vehicle travels along a second route through the driving environment, wherein the first autonomous vehicle and the second autonomous vehicle are in a fleet of autonomous vehicles;
selecting the first radar system of the first autonomous vehicle to operate in an active mode and the second radar system of the second autonomous vehicle to operate in a passive mode during the time period, wherein a first transmitter and a first receiver of the first radar system of the first autonomous vehicle are both enabled when operating in the active mode, and wherein a second transmitter of the second radar system of the second autonomous vehicle is disabled and a second receiver of the second radar system of the second autonomous vehicle is enabled when operating in the passive mode; and
transmitting, to the second autonomous vehicle, a control signal to cause the second radar system to operate in the passive mode during the time period,
wherein the first radar system of the first autonomous vehicle is selected to operate in the active mode and the second radar system of the second autonomous vehicle is selected to operate in the passive mode during the time period based on relative priorities of driving maneuvers to be performed by the first autonomous vehicle and the second autonomous vehicle.

2. The server computing system of claim 1, the acts further comprising:
transmitting, to the first autonomous vehicle, a control signal to cause the first radar system to operate in the active mode during the time period, or transmission information pertaining to the first radar system of the first autonomous vehicle.

3. The server computing system of claim 2, wherein the transmission information pertaining to the first radar system comprises location information specifying a location of the first radar system, or at least one of waveform information specifying a waveform of a radar signal transmitted by the first transmitter of the first radar system or timing information specifying timing of the radar signal transmitted by the first transmitter of the first radar system.

4. The server computing system of claim 1, wherein the first radar system of the first autonomous vehicle and the second radar system of the second autonomous vehicle are identified as likely to experience cross-radar interference based on a distance between the first radar system and the second radar system, a first field of view of the first radar system, and a second field of view of the second radar system.

5. The server computing system of claim 1, wherein the first radar system of the first autonomous vehicle is selected to operate in the active mode and the second radar system of the second autonomous vehicle is selected to operate in the passive mode during the time period based on relative locations of the first radar system and the second radar system and directions towards which it is desired to detect objects from the first radar system and the second radar system.

6. The server computing system of claim 1, the acts further comprising:

selecting the first radar system of the first autonomous vehicle to operate in the passive mode during a differing time period as the first autonomous vehicle travels along the first route through the driving environment, wherein the first transmitter of the first radar system of the first autonomous vehicle is disabled and the first receiver of the first radar system of the first autonomous vehicle is enabled when operating in the passive mode; and transmitting, to the first autonomous vehicle, a control signal to cause the first radar system to operate in the passive mode during the differing time period.

7. The server computing system of claim 1, the acts further comprising:

selecting the second radar system of the second autonomous vehicle to operate in the active mode during a differing time period as the second autonomous vehicle travels along the second route through the driving environment, wherein the second transmitter and the second receiver of the second radar system of the second autonomous vehicle are both enabled when operating in the active mode; and transmitting, to the second autonomous vehicle, a control signal to cause the second radar system to operate in the active mode during the differing time period.

8. A server computing system, comprising:

a processor; and memory that stores computer-executable instructions that, when executed by the processor, cause the processor to perform acts comprising:

identifying that a first radar system of a first autonomous vehicle and a second radar system of a second autonomous vehicle are likely to experience cross-radar interference during a time period as the first autonomous vehicle travels along a first route through a driving environment and the second autonomous vehicle travels along a second route through the driving environment, wherein the first autonomous vehicle and the second autonomous vehicle are in a fleet of autonomous vehicles;

selecting the first radar system of the first autonomous vehicle to operate in an active mode and the second radar system of the second autonomous vehicle to operate in a passive mode during the time period, wherein a first transmitter and a first receiver of the first radar system of the first autonomous vehicle are both enabled when operating in the active mode, and wherein a second transmitter of the second radar system of the second autonomous vehicle is disabled and a second receiver of the second radar system of the second autonomous vehicle is enabled when operating in the passive mode; and transmitting, to the second autonomous vehicle, a control signal to cause the second radar system to operate in the passive mode during the time period, wherein the first radar system of the first autonomous vehicle is selected to operate in the active mode and the second radar system of the second autonomous vehicle is selected to operate in the passive mode during the time period based on an estimate of information obtained from a target from bistatic measurement.

9. The server computing system of claim 8, the acts further comprising:

transmitting, to the first autonomous vehicle, a control signal to cause the first radar system to operate in the active mode during the time period, or transmission information pertaining to the first radar system of the first autonomous vehicle.

10. The server computing system of claim 9, wherein the transmission information pertaining to the first radar system comprises location information specifying a location of the first radar system, or at least one of waveform information specifying a waveform of a radar signal transmitted by the first transmitter of the first radar system or timing information specifying timing of the radar signal transmitted by the first transmitter of the first radar system.

11. The server computing system of claim 8, wherein the first radar system of the first autonomous vehicle and the second radar system of the second autonomous vehicle are identified as likely to experience cross-radar interference based on a distance between the first radar system and the second radar system, a first field of view of the first radar system, and a second field of view of the second radar system.

12. The server computing system of claim 8, wherein the first radar system of the first autonomous vehicle is selected to operate in the active mode and the second radar system of the second autonomous vehicle is selected to operate in the passive mode during the time period based on relative locations of the first radar system and the second radar system and directions towards which it is desired to detect objects from the first radar system and the second radar system.

13. The server computing system of claim 8, the acts further comprising:

selecting the first radar system of the first autonomous vehicle to operate in the passive mode during a differing time period as the first autonomous vehicle travels along the first route through the driving environment, wherein the first transmitter of the first radar system of the first autonomous vehicle is disabled and the first receiver of the first radar system of the first autonomous vehicle is enabled when operating in the passive mode; and transmitting, to the first autonomous vehicle, a control signal to cause the first radar system to operate in the passive mode during the differing time period.

14. The server computing system of claim 8, the acts further comprising:

selecting the second radar system of the second autonomous vehicle to operate in the active mode during a differing time period as the second autonomous vehicle travels along the second route through the driving environment, wherein the second transmitter and the second receiver of the second radar system of the second autonomous vehicle are both enabled when operating in the active mode; and transmitting, to the second autonomous vehicle, a control signal to cause the second radar system to operate in the active mode during the differing time period.

15. A server computing system, comprising:

a processor; and memory that stores computer-executable instructions that, when executed by the processor, cause the processor to perform acts comprising:

identifying that a first radar system of a first autonomous vehicle and a second radar system of a second autonomous vehicle are likely to experience cross-radar interference during a time period as the first autonomous vehicle travels along a first route through a driving environment and the second autonomous vehicle travels along a second route through the driving environment, wherein the first autonomous vehicle and the second autonomous vehicle are in a fleet of autonomous vehicles;

selecting the first radar system of the first autonomous vehicle to operate in an active mode and the second radar system of the second autonomous vehicle to operate in a passive mode during the time period, wherein a first transmitter and a first receiver of the first radar system of the first autonomous vehicle are both enabled when operating in the active mode, and wherein a second transmitter of the second radar system of the second autonomous vehicle is disabled and a second receiver of the second radar system of the second autonomous vehicle is enabled when operating in the passive mode; and transmitting, to the second autonomous vehicle, a control signal to cause the second radar system to operate in the passive mode during the time period, wherein the first radar system of the first autonomous vehicle is selected to operate in the active mode and the second radar system of the second autonomous vehicle is selected to operate in the passive mode during the time period based on respective numbers of radar systems of differing autonomous vehicles in the fleet of autonomous vehicles from which radar signals are receivable by the first radar system and the second radar system.

16. The server computing system of claim 15, the acts further comprising:

transmitting, to the first autonomous vehicle, a control signal to cause the first radar system to operate in the active mode during the time period, or transmission information pertaining to the first radar system of the first autonomous vehicle.

17. The server computing system of claim 16, wherein the transmission information pertaining to the first radar system comprises location information specifying a location of the first radar system, or at least one of waveform information specifying a waveform of a radar signal transmitted by the first transmitter of the first radar system or timing information specifying timing of the radar signal transmitted by the first transmitter of the first radar system.

18. The server computing system of claim 15, wherein the first radar system of the first autonomous vehicle and the second radar system of the second autonomous vehicle are identified as likely to experience cross-radar interference based on a distance between the first radar system and the second radar system, a first field of view of the first radar system, and a second field of view of the second radar system.

19. The server computing system of claim 15, wherein the first radar system of the first autonomous vehicle is selected to operate in the active mode and the second radar system of the second autonomous vehicle is selected to operate in the passive mode during the time period based on relative locations of the first radar system and the second radar system and directions towards which it is desired to detect objects from the first radar system and the second radar system.

20. The server computing system of claim 15, the acts further comprising:

selecting the first radar system of the first autonomous vehicle to operate in the passive mode during a differing time period as the first autonomous vehicle travels along the first route through the driving environment, wherein the first transmitter of the first radar system of the first autonomous vehicle is disabled and the first receiver of the first radar system of the first autonomous vehicle is enabled when operating in the passive mode; and transmitting, to the first autonomous vehicle, a control signal to cause the first radar system to operate in the passive mode during the differing time period.

* * * * *